A. S. LYMAN.
SHEET-METAL CANS FOR PRESERVING FOOD.
No. 195,621. Patented Sept. 25, 1877.
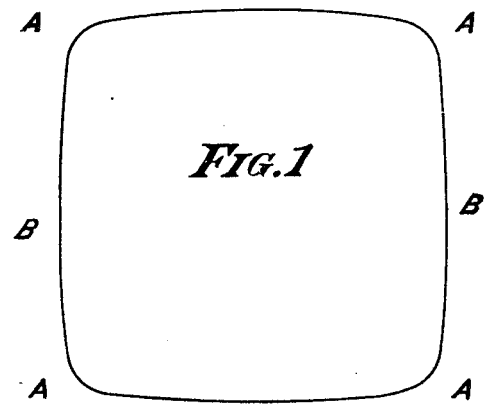
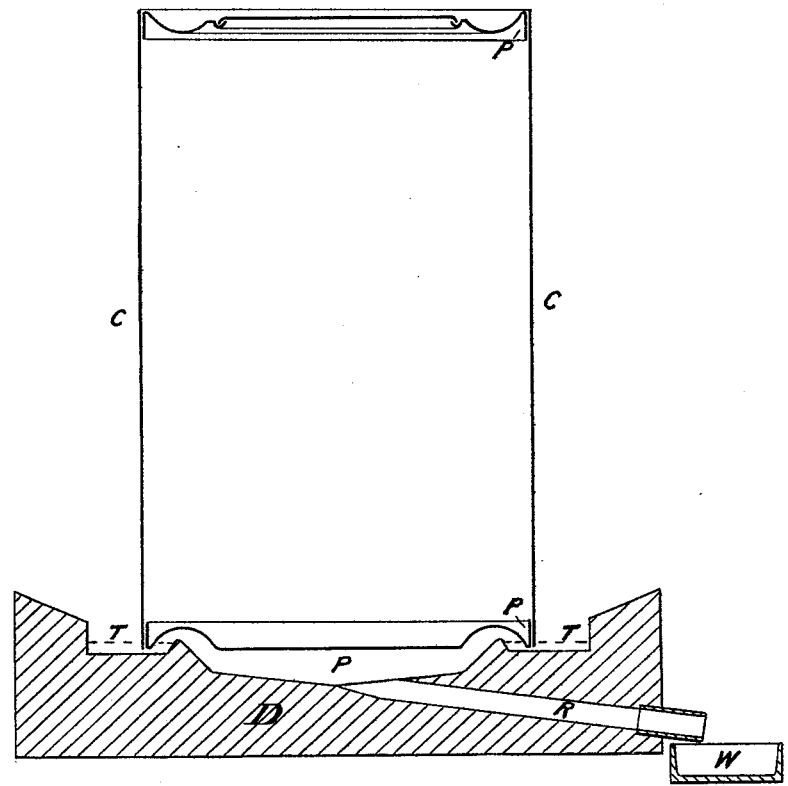
WITNESSES.
E. M. Lyman.
Ferd. C. Hahn.
INVENTOR.
A S Lyman

UNITED STATES PATENT OFFICE.

AZEL S. LYMAN, OF NEW YORK, N. Y., ASSIGNOR TO HIMSELF AND WATTS, PARKER & CO., OF SAME PLACE.

IMPROVEMENT IN SHEET-METAL CANS FOR PRESERVING FOOD.

Specification forming part of Letters Patent No. 195,621, dated September 25, 1877; application filed April 24, 1877.

*To all whom it may concern:*

Be it known that I, AZEL S. LYMAN, of the city, county, and State of New York, have invented a Sheet-Metal Can for Preserving Food, of which the following is a specification:

The object of my invention is to make a cheap, strong, tight, four-sided sheet-metal can for preserving food, without spreading solder containing lead on its inside to poison its contents.

The heads of these cans are made by stamping them in shape, as shown in Figure 1, which represents a plan, showing its rounded corners A A and slightly-curved sides B B. For cans with heads four inches square I have had the dies made with their corners A A on a radius of half an inch, and their sides B B on a radius of twelve (12) inches.

Fig. 2 represents a vertical section through the center of the can, representing it as standing on the soldering-block, with its lower head in process of being soldered into the sides.

The sides are first folded up nearly square, but with the corners rounded to fit the corners of the heads, and the side seams are soldered by the ordinary mode from the outside. The body is then driven down over the head, the sides of which, being slightly curved outward, cause it to fit tightly, so that, when soldered, it binds the head like a firmly-driven hoop. They are then left to stand a few seconds with their flanges immersed in hot tallow or other suitable flux; then transferred to the soldering-block, where their flanges are immersed in melted solder, which is contained in the shallow groove T T surrounding the sink P in the block of hot metal. Into this sink the projecting bottom of the can extends, and from the bottom of this sink the descending conduit R conducts any solder that may run over into this sink off into the outer reservoir W. This conduit also permits the air to flow freely back and forth.

The upper end of the can, having the opening for filling it, is generally soldered first, and, as the heads are both soldered in by this mode, no particular mechanical skill is required to solder the heads in firm and tight.

One boy attending five or six of these blocks can solder firmly eight or ten heads per minute, allowing the joints of each head to stand still about half a minute in the melted solder.

As the flanges extend some distance above the level of the solder, (shown by the dotted lines,) this solder, a large portion of which is or may be lead, cannot be spread on the inside of the can to poison its contents. Though very little solder is used, a very strong, tight, and cheap can is made.

The sides may be driven over the curved flanges of the heads with their flanges turned outward, if desired; but in this case joints have been found to spring a leak with a pressure of only about forty-five pounds per inch, while similar heads soldered into similar sides, as shown, stand a pressure of one hundred and twenty pounds per inch by the steam-gage without leaking.

It is evident that when the sides of the head-flanges are left straight, as in ordinary square cans, the sides do not bind the heads at all parts. They cannot be easily soldered by dipping; and, even after the expense of folding the heads and sides together and soldering them with the tinman's copper, the tensile strength of the sheet-iron is not brought into action like a firmly-driven hoop to prevent the tearing of the solder from the side of the head-flange, as it is in these improved cans.

I do not in this patent claim the peculiarity in the construction by which the end flanges are turned inward and a recess is provided just within the rim, to facilitate soldering, either alone or in connection with a plane central surface. Neither do I claim any soldering apparatus or process; but

I claim as my invention—

A can with sides nearly flat, having heads generally angular, with rounded corners and slightly-curved flanges, combined with a body having corresponding sides and corners, so that, when it is driven over the flanges of the heads, it binds them, substantially as and for the purposes set forth.

A. S. LYMAN.

Witnesses:
 E. M. LYMAN,
 FERD. C. HAHN.